(12) United States Patent
Wippermann et al.

(10) Patent No.: US 10,873,688 B2
(45) Date of Patent: *Dec. 22, 2020

(54) MULTI-APERTURE IMAGING DEVICE HAVING A BEAM-DEFLECTING DEVICE COMPRISING REFLECTING FACETS

(71) Applicant: Fraunhofer-Gesellschaft zur Foerderung der angewandten Forschung e.V., Munich (DE)

(72) Inventors: Frank Wippermann, Meiningen (DE); Andreas Brueckner, Jena (DE); Andreas Braeuer, Schloeben (DE); Alexander Oberdoerster, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,727

(22) Filed: Aug. 14, 2019

(65) Prior Publication Data
US 2019/0373154 A1    Dec. 5, 2019

Related U.S. Application Data

(63) Continuation of application No. 15/898,470, filed on Feb. 17, 2018, now Pat. No. 10,567,629, which is a (Continued)

(30) Foreign Application Priority Data

Aug. 19, 2015    (DE) .................. 10 2015 215 836

(51) Int. Cl.
*H04N 5/225*    (2006.01)
*G02B 27/64*    (2006.01)
(Continued)

(52) U.S. Cl.
CPC ......... *H04N 5/2259* (2013.01); *G02B 27/646* (2013.01); *H04N 5/2254* (2013.01);
(Continued)

(58) Field of Classification Search
None
See application file for complete search history.

(56) References Cited

U.S. PATENT DOCUMENTS 4,238,675 A * 12/1980 Turlej .................... G08B 13/19
                                                       250/353
5,654,549 A    8/1997 Landecker et al.
(Continued)

FOREIGN PATENT DOCUMENTS

CN    104704809 A    6/2015
DE    102014213371 B3    8/2015
(Continued)

*Primary Examiner* — Quan Pham
(74) *Attorney, Agent, or Firm* — Michael A. Glenn; Perkins Coie LLP

(57) ABSTRACT

The fact that a beam-deflecting device can be produced cost-effectively and without any losses of optical quality of the multi-aperture imaging device is used when a carrier substrate is provided for the same, wherein the carrier substrate is common to the plurality of optical channels and is installed with a setting angle, i.e. oblique with respect to the image sensor in the multi-aperture imaging device such that a deflection angle of deflecting the optical path of each optical channel is based, on the one hand, on the setting angle and, on the other hand, on an individual inclination angle with respect to the carrier substrate of a reflecting facet of a surface of the beam-deflecting device facing the image sensor, the reflecting facet being allocated to the optical channel.

17 Claims, 11 Drawing Sheets

Related U.S. Application Data continuation of application No. PCT/EP2016/069630, filed on Aug. 18, 2016.

(51) Int. Cl.
*H04N 5/232* (2006.01)
*H04N 5/341* (2011.01)

(52) U.S. Cl.
CPC ......... *H04N 5/2258* (2013.01); *H04N 5/2328* (2013.01); *H04N 5/3415* (2013.01); *G03B 2205/0007* (2013.01)

(56) References Cited

U.S. PATENT DOCUMENTS

| | | | |
|---|---|---|---|
| 5,708,470 A | 1/1998 | Holford | |
| 6,118,474 A | 9/2000 | Nayar | |
| 6,332,577 B1 | 12/2001 | Acosta et al. | |
| 8,599,301 B2 | 12/2013 | Dowski, Jr. et al. | |
| 9,398,264 B2 | 7/2016 | Georgiev et al. | |
| 2004/0141065 A1* | 7/2004 | Hara | H04N 5/2254 348/208.11 |
| 2006/0215054 A1 | 9/2006 | Liang et al. | |
| 2009/0002627 A1 | 1/2009 | Katz | |
| 2009/0122406 A1* | 5/2009 | Rouvinen | G02B 27/646 359/555 |
| 2009/0268081 A1 | 10/2009 | Tang | |
| 2010/0328471 A1 | 12/2010 | Boland et al. | |
| 2011/0102872 A1 | 5/2011 | Lin | |
| 2012/0001834 A1 | 1/2012 | Hudman et al. | |
| 2014/0111650 A1 | 4/2014 | Georgiev et al. | |
| 2014/0340536 A1 | 11/2014 | Scherling | |
| 2017/0118388 A1 | 4/2017 | Wippermann et al. | |
| 2017/0214861 A1* | 7/2017 | Rachlin | G03B 5/00 |

FOREIGN PATENT DOCUMENTS

| | | |
|---|---|---|
| JP | 2000321410 A | 11/2000 |
| JP | 2002131518 A | 5/2002 |
| JP | 2002171430 A | 6/2002 |
| JP | 2008180773 A | 8/2008 |
| JP | 2012027202 A | 2/2012 |
| KR | 20010024698 A | 3/2001 |
| KR | 20090084483 A | 8/2009 |
| KR | 20150072439 A | 6/2015 |
| KR | 20150090775 A | 8/2015 |
| TW | 200710552 A | 3/2007 |
| TW | I397995 B | 6/2013 |
| WO | 2006101733 A1 | 9/2006 |
| WO | 2014062481 A1 | 4/2014 |
| WO | 2015015383 A2 | 2/2015 |

\* cited by examiner

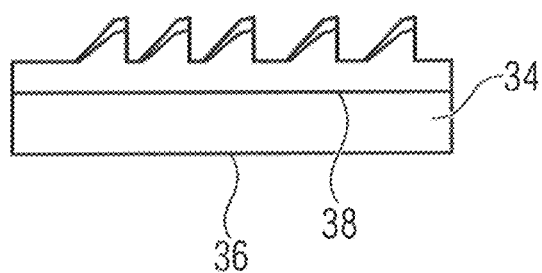
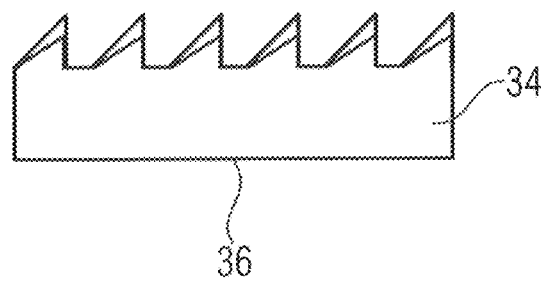
Fig. 5a
Fig. 5b
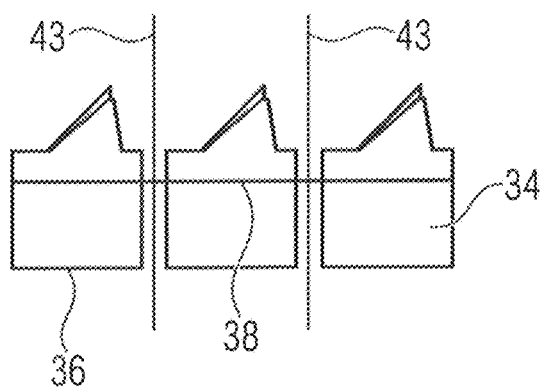
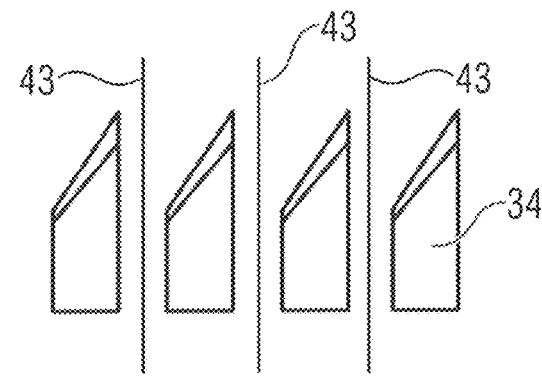
Fig. 6a
Fig. 6b
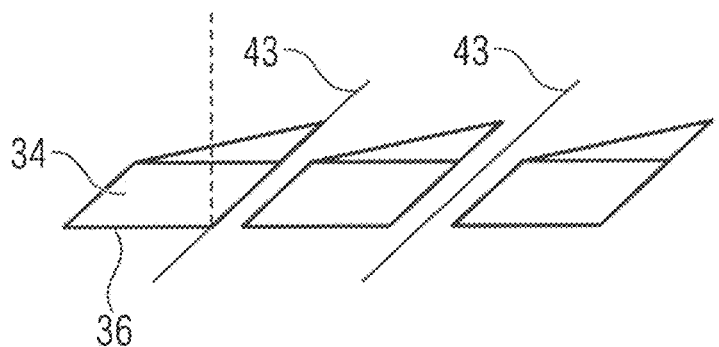
Fig. 7

US 10,873,688 B2

MULTI-APERTURE IMAGING DEVICE HAVING A BEAM-DEFLECTING DEVICE COMPRISING REFLECTING FACETS

CROSS-REFERENCE TO RELATED APPLICATIONS

This application is a continuation of copending U.S. patent application Ser. No. 15/898,470 filed Feb. 17, 2018, which is a continuation of International Application No. PCT/EP2016/069630, filed Aug. 18, 2016, which is incorporated herein by reference in its entirety, and additionally claims priority from German Application No. 10 2015 215 836.5, filed Aug. 19, 2015, which is also incorporated herein by reference in its entirety.

The present invention relates to a multi-aperture imaging device having a beam-deflecting device comprising reflecting facets.

BACKGROUND OF THE INVENTION

Multi-aperture imaging devices are in particular used in applications where a single-aperture imaging device would have disadvantages with regard to the installation size. For example, different portions of a field of view of a total field of view are projected on different areas of an image sensor. This takes place via several optical channels, wherein each channel is defined by a respective optic which performs projecting on the respective area of the image sensor. The optical paths of the optical channels in the optics can be parallel or almost parallel to one another. A specific installation height that cannot be fallen below results in a direction z of a distance of the image sensor to the optics of the plurality of optical channels. This is in particular noticeable in single-line arrays of optical channels, since there the extension of the combination of image sensor and optics of the optical channels measured in a direction along the optical paths is greater than the installation height (y-axis), such that depending on the application an installation of image sensor and optical channels would be advantageous, according to which the total field of view to be actually covered is not in front of, but at the side of the combination of image sensor and optical channels. In that case, it is possible to use a beam-deflecting device for deflecting the optical paths of the optical channels. Here, the beam-deflecting device can also be used for changing the mutual orientation of the optical paths from the parallel or almost parallel course in order to, for example, starting from a single-line array of the optical channels, cover a total field of view two-dimensionally in partial fields of view, i.e. with one partial field of view per optical channel. For this, the beam-deflecting device has one reflecting facet per optical channel. In particular in the low-cost sector it is difficult to produce the facets with, on the one hand, sufficient optical accuracy for preventing image errors and, on the other hand, in a cost-effective manner. Forming a prism of polymer, for example, which comprises a facet-like chamfered surface is difficult since the forming process is accompanied by loss. This does not only apply to polymers but also to glass. In both cases, losses occur in the transition from liquid or melt into the solid state. This results again in form deviations between the tool and the molding tool respectively, or the form on the one hand and the molded structure on the other hand, wherein the form deviations are again not acceptable in the above-mentioned usage in multi-aperture devices.

SUMMARY

According to an embodiment, a multi-aperture imaging device may have: an image sensor; a plurality of optical channels; a beam-deflecting device for deflecting optical paths of the plurality of optical channels, wherein the beam-deflecting device comprises a carrier substrate common for the plurality of optical channels, wherein a deflection angle of deflecting the optical paths of each optical channel is based on a setting angle of the carrier substrate of the beam deflection apparatus with respect to the image sensor and on an inclination with respect to the carrier substrate, which varies among the optical channels, of a reflecting facet of a surface of the beam deflecting apparatus facing the image sensor, the reflecting facet being allocated to the optical channel.

Another embodiment may have the manufacturing of an inventive multi-aperture imaging device, wherein the reflecting facets allocated to the optical channels are generated by: molding additional material onto the carrier substrate or injection molding or pressing material such that the carrier substrate is formed integrally with the reflecting facets allocated to the optical channels in the surface facing the image sensor.

The core idea of the present invention is the finding that that a beam-deflecting device can be produced cost-effectively and without any losses of optical quality of the multi-aperture imaging device when a carrier substrate is provided for the same, wherein the carrier substrate is common to the plurality of optical channels and is installed with a setting angle, i.e. oblique with respect to the image sensor in the multi-aperture imaging device such that a deflection angle of deflecting the optical path of each optical channel is based, on the one hand, on the setting angle and, on the other hand, on an individual inclination angle with respect to the carrier substrate of a reflecting facet of a surface of the beam-deflecting device facing the image sensor, the reflecting facet being allocated to the optical channel In that way, the "coarse deflection" of the optical paths of the optical channels is obtained via the setting angle. Thus, this portion produces no loss problem in the molding process for producing the beam-deflecting device. Rather, it is, for example, possible that the inclination angles are limited to the mutual angular differences of the beam deflections of the optical channels, i.e. are small and result in only a small volume to be formed or molded.

BRIEF DESCRIPTION OF THE DRAWINGS

Embodiments of the present invention will be detailed subsequently referring to the appended drawings, in which:

FIGS. 3a-3d are side views or a top view of a beam-deflecting device according to an embodiment, wherein FIG. 3a shows a side view where the substrate of the beam-deflecting device can be seen in the substrate plane itself, wherein the line extension direction is transversal to the side view, FIG. 3c shows the respective side view from the opposite direction, FIG. 3b a top view of the reflecting facets perpendicular to the substrate plane and FIG. 3d a side view of the mirror deflecting device laterally along the line extension direction;

FIG. 5a is a side sectional view of several mirror deflecting devices formed in multiple use by molding on a common substrate and that are not yet singulated, wherein the side sectional view is perpendicular to the line extension direction when the later installation of the mirror deflecting devices into the multi-aperture imaging device is considered, or perpendicular to the longitudinal direction of the mirror deflecting devices with regard to the state after singulation;

FIG. 5b is a side sectional view according to FIG. 5a, wherein, however, multi-use production by integer forming by means of impressing or injection molding is illustrated, where the impressed or molded substrate is integrally formed and includes the facets on a side facing the image sensor;

FIG. 6a is the side sectional view of FIG. 5a with shown singulation cutting lines parallel to the line extension direction or longitudinal direction of the mirror deflecting devices;

FIG. 6b is a side sectional view for the case of FIG. 5b for FIG. 5a, corresponding to FIG. 6a;

FIG. 7 is a side sectional view of beam-deflecting devices produced in multi-use according to FIG. 5a or FIG. 5b, wherein here, exemplarily, the cutting planes for singulation do not run perpendicular to the substrate, but oblique to the substrate;

DETAILED DESCRIPTION OF THE INVENTION

Figure 1:
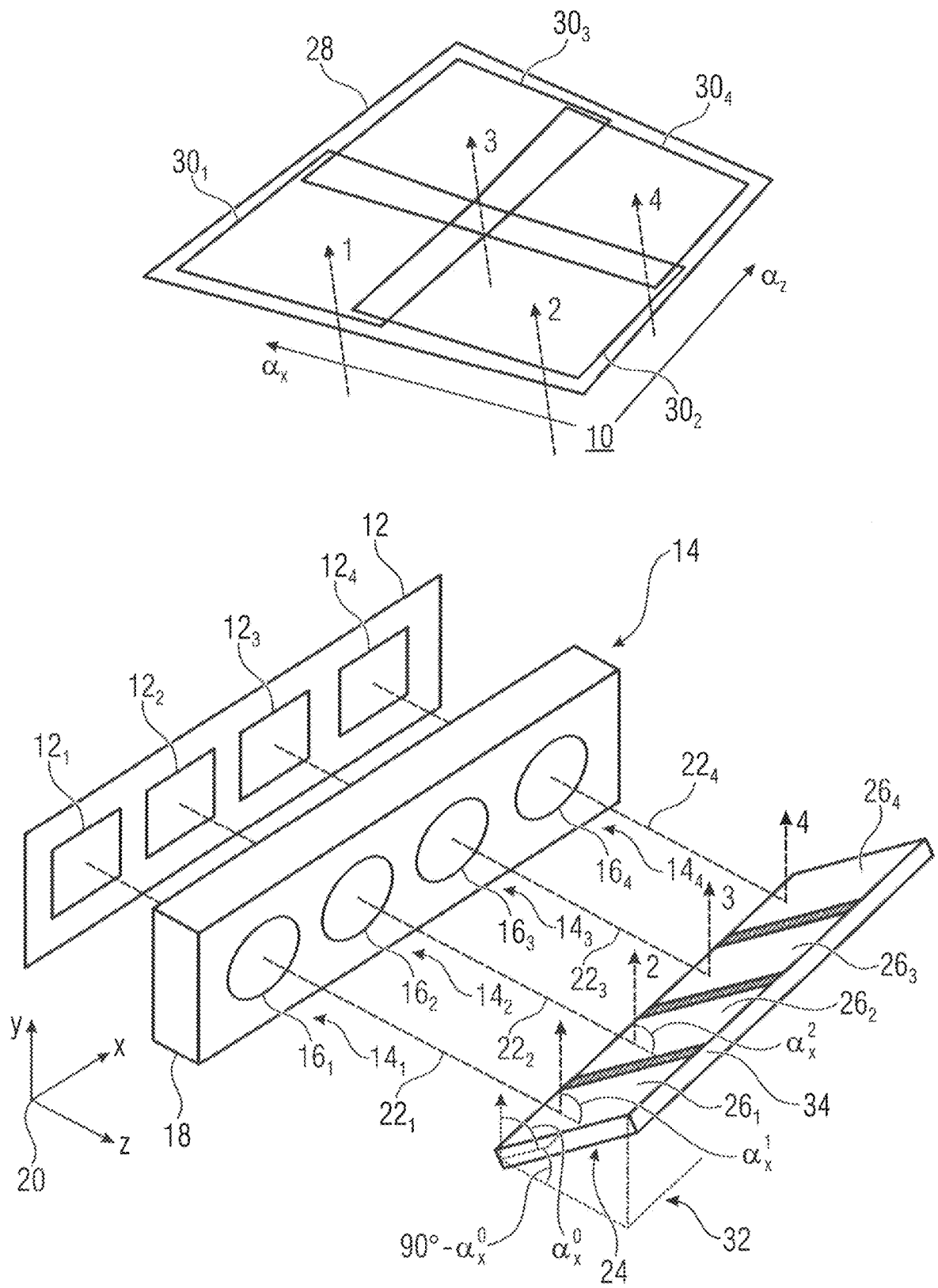
FIG. 1 is a schematic perspective view of a multi-aperture imaging device according to an embodiment.

FIG. 1 shows an embodiment of a multi-aperture imaging device. The multi-aperture imaging device 10 of FIG. 1 includes an image sensor 12 and a plurality 14 of optical channels, each of which being defined by respective optics $16_1$, $16_2$, $16_3$ and $16_4$. Each optical channel $14_1$, $14_2$, $14_3$, $14_4$ projects, by means of the allocated optics $16_1$-$16_4$, a channel-individual section of a total field of view of the multi-aperture imaging device 10 on a respective image sensor area $12_1$, $12_2$, $12_3$ or $12_4$. The image sensor 12 can, for example, be a chip comprising pixel arrays in the image sensor areas $12_1$-$12_4$. Alternatively, the image sensor 12 could comprise one pixel array chip per image sensor area $12_1$-$12_4$. Again, it would be possible that the image sensor 12 comprises a pixel array extending continuously across the image sensor areas $12_1$-$12_4$, i.e. a pixel array having a rectangular or varying extension in which the image sensor areas $12_1$-$12_4$ lie, wherein in that case, for example, merely the image sensor areas $12_1$-$12_4$ of this common continuous pixel array of the image sensor 12 are read out. Different combinations of these alternatives are also possible, such as the existence of one chip for two or more channels and a further chip for again different channels or the like. In the case of several chips of the image sensor 12 the same can be mounted, for example on one or several boards, such as all of them together or in groups or the like.

The optics $16_1$-$16_4$ consist, for example, each of a lens or a group of lenses which can be held as shown in FIG. 1 by a common holder 18. Exemplarily, the holder 18 is formed of transparent material and is penetrated by the optical paths of the optical channels but there are also other alternatives for holders.

Advantageously, the image sensor areas $12_1$-$12_4$ are disposed in a common plane, namely the image plane of the optical channels 14. In FIG. 1, this plane is shown exemplarily parallel to the plane spanned by an x- and an y-axis of a Cartesian coordinate system shown in FIG. 1 for simplifying the following description and provided with reference number 20.

In a plane parallel to the image sensor 12, i.e. parallel to the xy-plane, for example, optics $16_1$-$16_4$ are also disposed next to one another. In the example of FIG. 1, the relative positions of the image sensor areas $12_1$-$12_4$ in the image sensor plane are additionally positioned congruently to the relative positions of the optics $16_1$-$16_4$ and the optics $16_1$-$16_4$ along the x- and y-axis, i.e. lateral in relation to the image sensor 12 such that optical centers of the optics $16_1$-$16_4$ are centered with respect to the centers of the image sensor areas $12_1$-$12_4$. This means that in the example of FIG. 1 optical axes $22_1$-$22_4$ of the optical channels $14_1$-$14_4$ run parallel to one another and parallel to the z-axis of the coordinate system 20 in relation to which optical axes the image sensor areas $12_1$-$12_4$ and the optics $16_1$-$16_4$ are centered. It should be noted that there are also alternatives with respect to the above described arrangement of image sensor areas $12_1$-$12_4$ and optics $16_1$-$16_4$. For example, a slight divergence of the optical axes $22_1$-$22_4$ would also be possible. Further, it is possible that the multi-aperture imaging device includes one or several means that are able to change a relative location of the optics $16_1$-$16_4$ with respect to the image sensor areas $12_1$-$12_4$ in lateral direction, i.e. in x- and/or y-direction such as for image stabilization. In this respect, reference is made to FIG. 10.

The optics $16_1$-$16_4$ project objects in a scene with an overall or total field of view of the multi-aperture imaging device 10 on the allocated image sensor areas $12_1$-$12_4$ and for this the same are positioned at a respective interval or a respective distance from the image sensor 12. While this distance might also be fixed, the multi-aperture imaging device could alternatively have a means for changing this image sensor-to-optics distance, such as for manual or automatic change of focus.

In FIG. 1, the plurality 14 of optical channels $14_1$-$14_4$ is formed as single-line array. In the case of FIG. 1, the optical channels $14_1$-$14_4$ are disposed beside one another along the x-axis. Thus, the x-axis corresponds to the line extension direction of the array 14. The image sensor areas $12_1$-$12_4$ are also disposed next to one another along this direction. In FIG. 1, the number of optical channels is exemplarily four, but a different number greater than or equal to two would also be possible. In the case of a linear array of optical channels as illustrated in FIG. 1, the size extension of the multi-aperture imaging device 10, as limited towards the bottom by the image sensor 12 and the optics 16, is greatest along the line extension direction. The minimum extension of the multi-aperture imaging device 10 as determined by the mutual arrangement of image sensor 12 to optics 16 along the z-axis, i.e. along the optical axes or optical paths of the optical channels $14_1$-$14_4$, is smaller than the minimum extension along the x-axis but, due to the implementation of the optical channels $14_1$-$14_4$ as single-line array, the same is greater than the minimum extension of the multi-aperture imaging device in the lateral direction y perpendicular to the line extension direction x. The latter is given by the lateral extension of each individual optical channel $14_1$-$14_4$, such as the extension of the optics $16_1$-$16_4$ along the x-axis, possibly including the holder 18. In this situation, depending on the application, such as for example the installation of the multi-aperture imaging device into the housing of a portable device, such as a mobile phone or the same, where the housing is very flat, it can be desirable to align image sensor 12 and optics $16_1$-$16_4$ such that the fields of view of the optical channels without beam deflection actually look into directions deviating from an actually desired field of view direction of the multi-aperture imaging device 10. For example, it could be desirable to install the multi-aperture imaging device 10 such that image sensor 12 and optics $16_1$-$16_4$ are aligned perpendicular to the greatest sides or the main sides of the flat housing, i.e. the optical axis $22_1$-$22_4$ between image sensor 12 and optics $16_1$-$16_4$ are parallel to these main sides, while the scene to be captured is in a direction perpendicular thereto, i.e. in front of the one main side which is for example the front side, and, for example, comprises a screen or in front of the other main side which is, for example, the rear of the housing.

For that reason, the multi-aperture imaging device 10 includes a beam-deflecting device deflecting the optical paths or the optical axes $22_1$-$22_4$ of the plurality of optical channels 14, such that the total field of view of the multi-aperture imaging device 10, seen from the multi-aperture imaging device 10, is not in the direction of the z-axis but elsewhere. FIG. 1 presents the exemplary case that the total field of view of the multi-aperture imaging device 10 after deflection is essentially along the y-axis, i.e. deflection essentially takes place in the zy-plane.

Before a further function of the beam-deflecting device 24 will be discussed, it should be noted that the explanations concerning the single-line character of the array 14 of optical channels is not to be seen in a limiting manner and that embodiments of the present application also include implementations where the plurality of optical channels are arranged in a two-dimensional array. For example, from different points of view than the ones discussed above, it could be desirable to perform reorientation of the total field of view of the multi-aperture imaging device 10 relative to the combination of image sensor 12 and optics $16_1$-$16_4$. Such points of view could concern, for example, also the additional function of the beam-deflecting device 24 described below.

As described above, in the embodiment of FIG. 1, the optical axes $22_1$-$22_4$ are parallel to one another prior to or without deflection by the beam-deflecting device 24, or, for example at the optics $16_1$-$16_4$, as shown in FIG. 1, or only deviate slightly therefrom. The corresponding centered positioning of optics $16_1$-$16_4$ as well as the image sensor areas $12_1$-$12_4$ is easy to produce and favorable with regard to minimizing installation space. Parallelism of the optical paths of the optical channels also has the effect that the partial fields of view that are covered by the individual channels $14_1$-$14_N$ or projected on the respective image sensor areas $12_1$-$12_4$ would completely overlap without any further measures, namely beam deflection. In order to cover a greater total field of view by the multi-aperture imaging device 10, it is a further function of the beam-deflecting device 24 of FIG. 1 to provide the optical paths with divergence such that the partial fields of view of the channels $14_1$-$14_N$ overlap less with one another.

For example, it is assumed that the optical axes $22_1$-$22_4$ of the optical paths of the optical channels $14_1$-$14_4$ are parallel to one another before or without the beam-deflecting device 24 or deviate with respect to a parallel orientation along the orientation averaged across all channels by less than one tenth of a minimum aperture angle of the partial fields of view of the optical channels $14_1$-$14_N$. Without any additional measures, the partial fields of view will mostly overlap. Therefore, the beam-deflecting device 24 of FIG. 1 includes, for each optical channel $14_1$-$14_N$, a reflecting facet $26_1$-$26_4$ clearly allocated to that channel, which are each optically planar and inclined to one another, namely such that the partial fields of view of the optical channels overlap less as regards to a spatial angle and cover, for example, a total field of view having an aperture angle which is, for example, greater than 1.5 times the aperture angle of the individual partial fields of view of the optical channels $14_1$-$14_N$. In the exemplary case of FIG. 1, the mutual inclination of the reflecting facets $26_1$-$26_4$ has the effect, for example, that the optical channels $14_1$-$14_N$ actually disposed linearly next to one another along the x-axis cover the total field of view 28 according to a two-dimensional arrangement of the partial fields of view $30_1$-$30_4$.

Figure 2A:
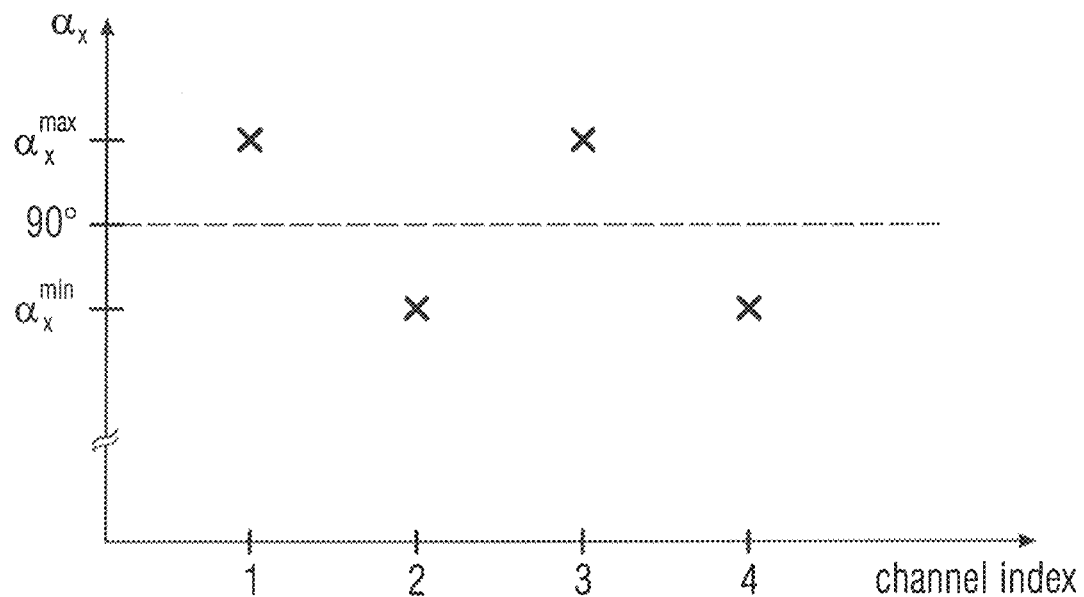
FIG. 2a is a graph showing the beam-deflection angle $\alpha_x$, around the x-axis for the different channels, plotted on a channel index along the horizontal axis, wherein $\alpha_x$ is plotted along the y-axis in arbitrary units.
Figure 2B:
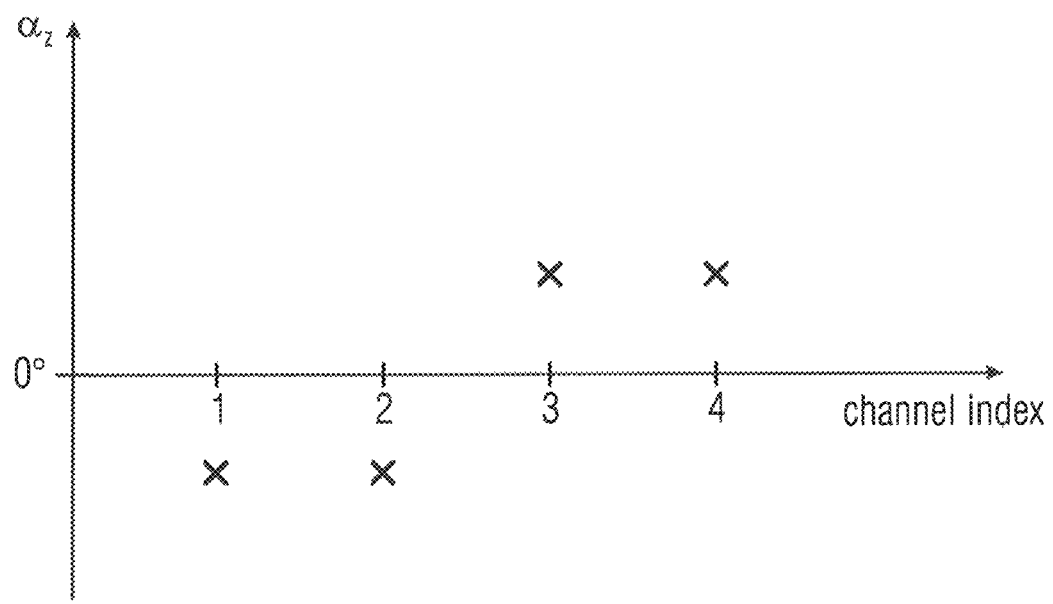
FIG. 2b is a respective graph where the deflection angle for the optical channels is plotted on the y-axis along the transversal direction perpendicular thereto, namely $\alpha_z$, i.e. the angular deflection out of the yz-plane.
Figure 3A:
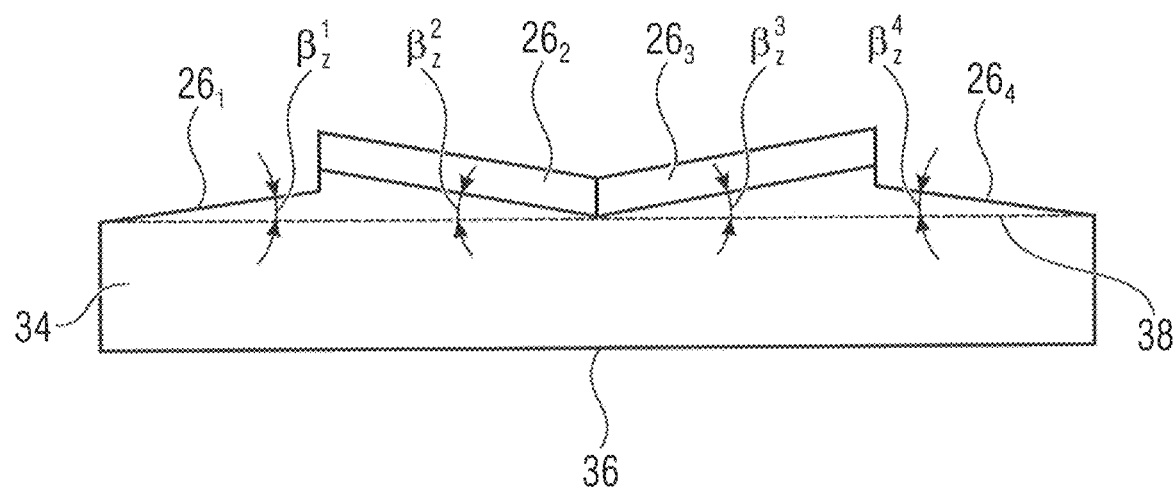
Figure 3B:
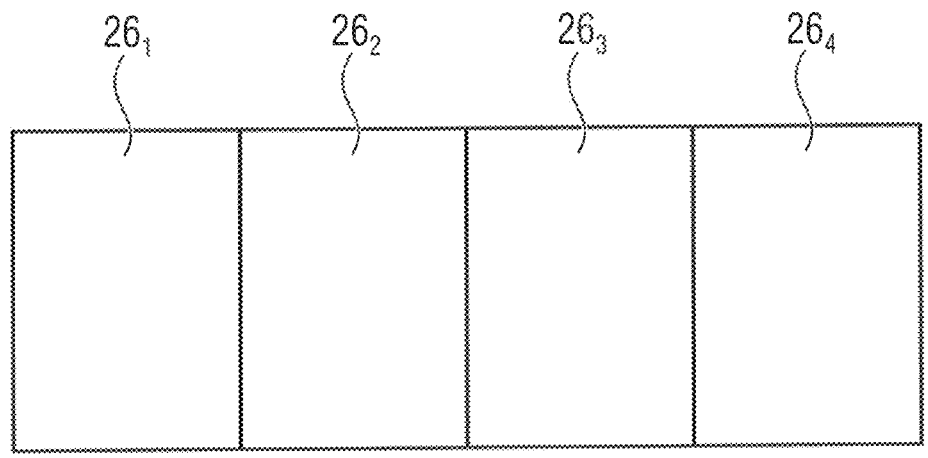
Figure 3C:
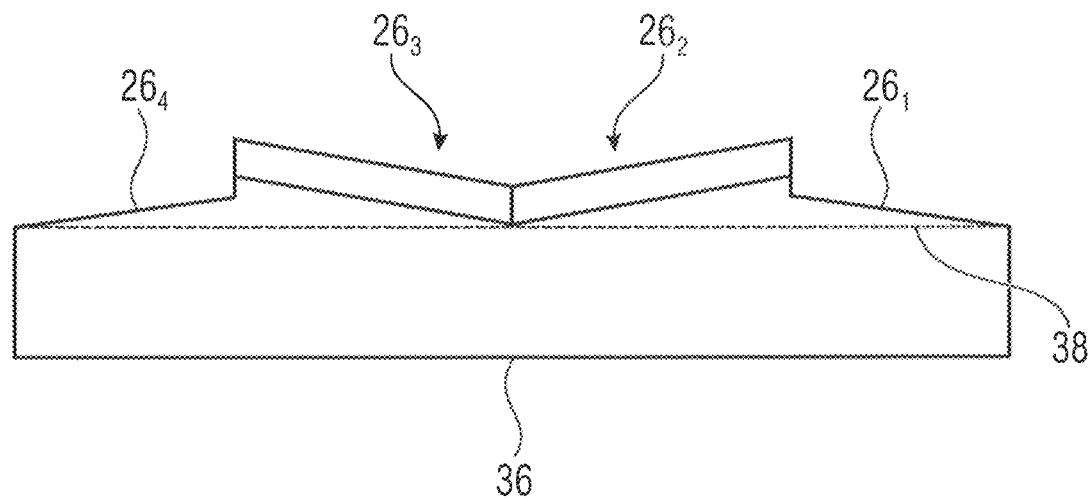
Figure 3D:
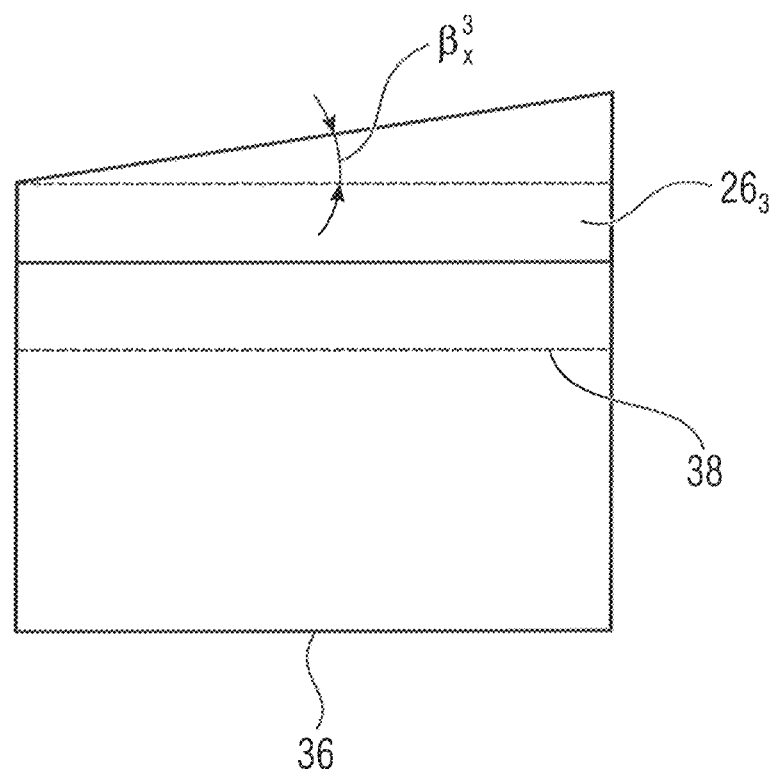

If, in the embodiment of FIG. 1, the angular deflection of optical axes $22_1$-$22_4$ of the optical channel $14_1$-$14_4$ is considered in the plane spanned or defined by the averaged direction of the optical axis prior to beam deflection and the averaged direction of the optical axis after beam deflection, i.e., in the xy-plane in the example of FIG. 1 on the one hand and in the plane running perpendicular to the latter plane and parallel to the averaged direction of the optical axis after beam deflection, the behavior shown in FIG. 2a and FIG. 2b results. FIG. 2a shows the beam deflection $\alpha_x$ in the first plane and FIG. 2b shows the beam deflection in the latter plane, namely $\alpha_z$. FIGS. 2a and 2b illustrate the case that the average beam deflection of the optical axes is such that the average beam direction after beam deflection corresponds to the y-axis. On average, the optical axes of the optical channels are deflected by 90° in the yz-plane around the x-axis and, on average, the optical axes are not tilted out of the yz-plane.

As indicated by dotted lines in FIG. 1 at 32, an essentially prism-shaped body could be formed as beam-deflecting device, but this would be accompanied by the disadvantages already indicated in the introductory part of the description of the present application: the loss occurring during molding depends on the amount of material of the material to be formed and, hence, molding a body as indicated by 32 would be accompanied by difficulties that increase the production costs or result in a lower quality of the optical projections of the optical channels $14_1$-$14_N$.

For the latter reason, as illustrated in more detail below, the beam-deflecting device 24 of FIG. 1 is produced such that the same comprises a common carrier substrate 34 which the plurality 14 of optical channels have in common, i.e., which extends across all optical channels. The carrier substrate 34 is placed in a tilted manner with the setting angle $\alpha_x^0$ with respect to the image sensor 12, namely around the axis around which the average direction of the optical axes of the optical channels is deflected, i.e., the x-axis in FIG. 1. This setting angle has the effect that the surface of the beam-deflecting device 24 facing the image sensor already effects "coarse deflection" of the optical paths of the optical channels.

If $\alpha_x^{min}$ is, for example, the minimum beam deflection of the optical axes $16_1$-$16_4$ of the optical channels $14_1$-$14_4$ around the x-axis, i.e., $\alpha_x^{min}=\min\{\alpha_x^i\}$ with $\alpha_x^i$ equal to the beam deflection of the optical channel $14_i$ with $\alpha_x^i=0$, meaning that no beam deflection occurs, then the carrier substrate 24 can be inclined with respect to the image sensor 12 such that $90°-\alpha_x^0 \leq \frac{1}{2}\cdot\alpha_x^{min}$ applies, wherein $\alpha_x^0$ is greater than 0° and less than 90° and $\alpha_x^0=0°$ is to correspond the plane-parallel orientation of the carrier substrate 34 to the image sensor 12. This case will be discussed below with reference to FIG. 4a. As can be seen, in this case, the reflecting facets $26_{1-4}$ are not inclined in the yz-plane with respect to the substrate or only in the direction, such that the lateral face of the substrate closer to the image sensor is narrower than the one pointing in the opposite direction. When equality applies, i.e., $90°-\alpha_x^0=\frac{1}{2}\cdot\alpha_x^{min}$, at least one facet exists which is not inclined with respect to the substrate in the yz-plane.

$\alpha_x^{max}$ may be, for example, the maximum beam deflection of the optical axes $16_1$-$16_4$ of the optical channels $14_1$-$14_4$ around the x-axis, i.e., $\alpha_x^{max}=\max\{\alpha_x^i\}$. Then, for example, the carrier substrate 24 could also be inclined with respect to the image sensor 12 such that $90°-\alpha_x^0 \geq \frac{1}{2}\cdot\alpha_x^{max}$ applies. This case will be discussed below with reference to FIG. 4b. As can be seen there, in this case, the reflecting facets $26_{1-4}$ are not inclined in the yz-plane with respect to the substrate or only in the direction, such that the lateral face of the substrate closer to the image sensor is wider than the one pointing in the opposite direction. If equality applies, i.e., $90°-\alpha_x^0=\frac{1}{2}\cdot\alpha_x^{max}$ at least one facet exists which is not inclined with respect to the substrate in the yz-plane.

In the described manner, it is possible that the beam-deflecting device 24 comprises, beyond a purely parallelepiped shape, additional material (in addition to the pure parallelepiped shape) merely on the side facing the image sensor 12 in order to form the mutual inclinations of the reflecting facets $26_1$-$26_4$. These inclination angles are, however, much smaller than the total deflection angles $\alpha_x^i$, since the same are merely to perform the residual deflections of the optical paths. For the inclination angles $\beta_x^i$ in the y z-plane, namely the residual deflection around the x-axis, $\beta_x^i=|\frac{1}{2}(\alpha_x^i=2(90°-\alpha_x^0)|$ applies. The inclination angles in the yz-plane correspond to the halves of the finer channel-individual deflections. In the other transversal direction concerning the beam deflection out of the YZ-plane, the deflection angles $\alpha_z^i$ and hence also the inclination angles $\beta_z^i$ of the facets out of the substrate plane along the x-axis are small anyway.

For the deflection angles of deflecting the optical path of each optical channel by the beam-deflecting device 24, this means that the same are each based on the setting angle $\alpha_x^0$ as well as the respective inclination of the reflecting facet allocated to the optical channel with respect to the carrier substrate 34 itself. These mentioned face-individual inclinations of the facets $26_1$-$26_4$ can be described, as stated above, by an inclination angle in the yz-plane and an inclination angle with respect to the normal of the carrier substrate 3 in the plane perpendicular thereto. It is advantageous, when it applies, that for each channel the setting angle $\alpha_x^0$ is greater than the inclination, i.e., $\alpha_x^0 > \max(\beta\beta_x|, |\beta_z|)$ for all channels. It is even more advantageous when said inequality is fulfilled already for $\alpha_x^0/2$ or even for $\alpha_x^0/3$. In other words, it is advantageous when the setting angle is great compared to the inclination angles of the facets is $26_1$-$26_N$, such that additional material with respect to a pure parallelepiped shape of the beam-deflecting device 24 is low. $\alpha_x^0$ can be, for example, between 30° and 60°, each inclusively.

FIGS. 3a-3d shows side views of a beam-deflecting device according to an embodiment for an example of 4 optical channels that are arranged linearly or on one side as illustrated exemplarily in FIG. 1. The beam-deflecting device 24 of FIG. 3a-3d could be used as beam-deflecting device of FIG. 1, wherein then the partial fields of view would not cover the total field of view in clockwise direction 3, 4, 2, 1 as illustrated in FIG. 1, but in clockwise direction according to the order 4, 2, 1, 3. The inclination angles of facets $26_1$-$26_4$ are shown in FIGS. 3a-3d. The same are distinguished from one another or are allocated to the respective channel by superscript indices 1 to 4. Here, both $\beta_x^1$ and $\beta_x^4$ are 0°. The rear side of the carrier substrate, i.e. the side opposing the surface provided with facets $26_1$-$26_4$ is indicated by 36 in FIGS. 3a-3d. The material forming the parallelepiped-shaped portion of the carrier substrate 34 is below the dotted line 38. It can be seen that the additional material which will be added to the same has little volume, such that molding is made easier.

The production of the beam-deflecting device 24 of FIGS. 3a-3d can, for example, be performed in that the additional material is molded onto the carrier substrate 34 by a molding tool. Here, the carrier substrate 34 could be glass while the molded additional material thereon is polymer. A further option would be forming the beam-deflecting device 24 of FIGS. 3a-3d integrally by injection molding or the same.

Figure 4A:
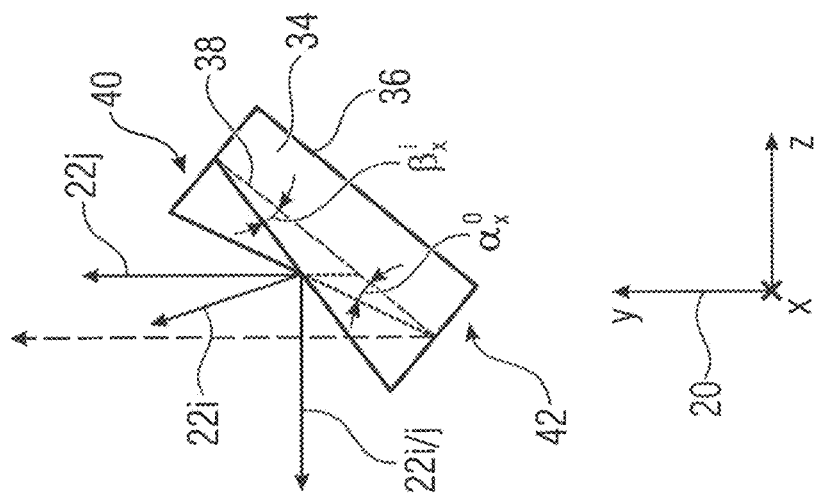
FIG. 4a is a schematic side view of the beam-deflecting device with a shown setting angle and channel-individual inclination angles, wherein the side sectional plane runs perpendicular to the line extension direction and wherein the case is illustrated that all facets are inclined such that the lateral face of the substrate closer to the image sensor and running parallel to the line extension direction is thinner than the opposite lateral face facing away from the image sensor.
Figure 4B:
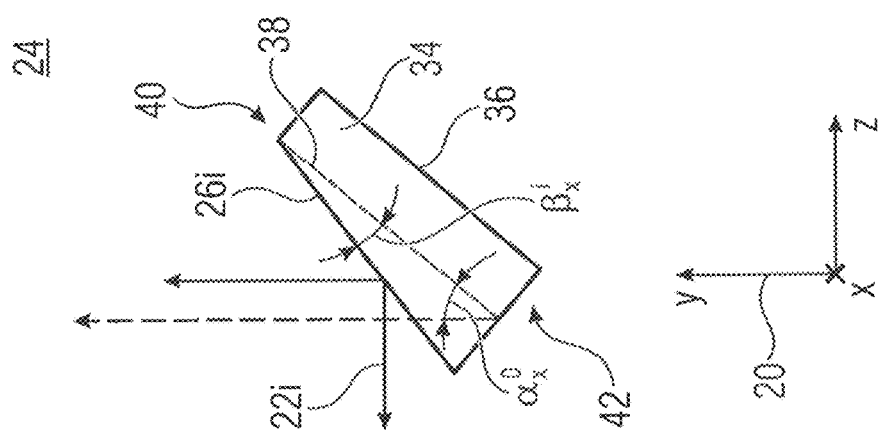
FIG. 4b is a side view of the beam-deflecting device for an alternative case to FIG. 4a that the lateral face of the substrate facing the image sensor is thicker than the lateral face further apart from the image sensor.
Figure 4C:
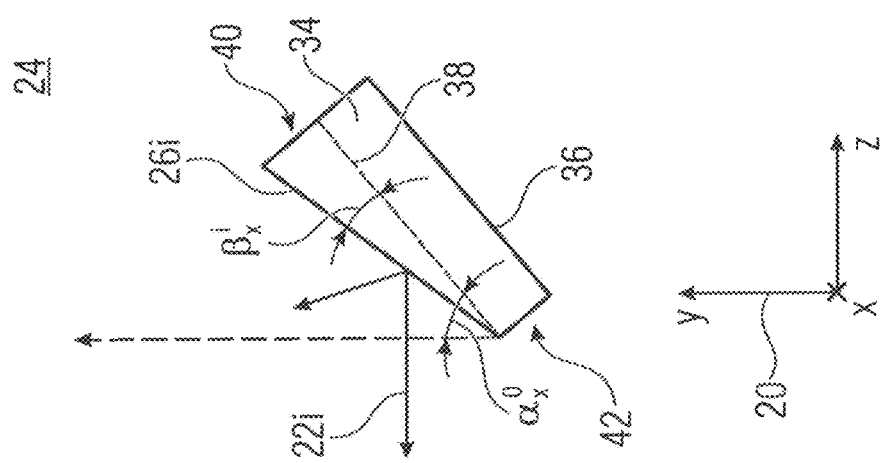
FIG. 4c is a side sectional view of a mirror deflecting device for the case that both facets according to FIG. 4a as well as facets according to FIG. 4b exist.

In the above described statements, it has already been described that, as indicated in FIG. 4a, the inclination angles of the facets $26_i$ of the channels $14_i$ can be inclined around the x axis or in the yz plane in the same direction, namely by the setting angle $\alpha_x^0$ of the carrier substrate 34 of the beam-deflecting device 24 relative to the image sensor 12, such that it applies for all facets $26_i$ of all channels that the thickness of the beam-deflecting device 24 on the side 40 further apart from the image sensor 12 is greater than on the side 42 closer to the image sensor. There are, however, alternatives to this which are illustrated in FIGS. 4b and 4c. According to FIG. 4b, the above stated circumstance is reversed. This means the inclination angles of facets $26_i$ in the yz plane, i.e. the inclinations $\beta_x^i$ are such that it applies for all facets $26_i$ that the beam-deflecting device 24 has a side 42 facing the image sensor where the same is thicker than on the side 40 facing away from the image sensor. Thus, FIG. 4b applies with reference to FIG. 2a and FIG. 2b: $90°-\alpha_x^0 \geq \frac{1}{2} \cdot \alpha_x^{max}$. According to FIG. 4c it is possible that both cases occur; i.e. a facet $26_i$ is inclined according to FIG. 4a and a facet $26_i$ is inclined according to FIG. 4b. Thus, $\frac{1}{2} \cdot \alpha_x^{max} \leq 90° - \alpha_x^0 \leq \frac{1}{2} \cdot \alpha_x^{min}$ applies.

Thus, the embodiment of FIG. 1 with the deflecting device of FIG. 3 represents a multi-aperture imaging device where each channel defines a projection on an image sensor area $12_i$ and includes an allocated imaging optics $16_i$ and is deflected by an allocated segment or a facet $16_i$ of the beam-deflecting device 14. The facets $26_i$ represent portions of the surface or side of the beam-deflecting device 24 facing the image sensor 12. The same can be produced by means of molding of a polymer, such as a UV-curable polymer on a common planar substrate 34 such as glass, polymer, metal, silicon or other suitable materials. The body consisting of the planar substrate 34 and the prisms molded thereon, namely one for each channel $14_i$, wherein the body forms the deflecting device 24, can be aligned with the optical axis $22_i$ of the imaging channels $14_i$ such that the surface normal of the substrate 34, i.e. the normal on the parallelepiped-shaped portion of the beam-deflecting device 24 takes up an angle >0 and <90° to the optical axis $22_i$, which is advantageously approximately 45° or lies between 30° and 60°, each inclusively.

According to an embodiment, a plurality of deflecting devices 24 are produced simultaneously on a substrate by means of replication processes. An embodiment will follow. For providing the facets $26_i$ with reflectivity, either a reflecting material can be molded or the front sides of facets $26_i$ can be provided with mirroring. The mirrors can include both metallic and dielectric layers.

Again, in other words, deflecting devices according to FIG. 3 can be produced in multi-use. Here, the deflecting devices as indicated in FIG. 5a can be produced by means of molding, for example polymer, on a planar substrate or production is performed by means of casting or impressing glass or polymer, such that a single-component entity results as indicated in FIG. 5b. The individual deflecting devices can then be singulated subsequently by sawing, laser, sand or water jet cutting. The separation could obviously be performed by means of sawing cuts 43 perpendicular to the carrier substrate 34 or perpendicular to the rear side 38 of the same. However, advantageously, the separation can also be performed such that the cutting surfaces result by the singulation cuts, taking up an angle≠0 with the area normals of the carrier substrate 34. Perpendicular cuts are illustrated in FIG. 6a for the case of molding polymer on a carrier substrate and in FIG. 6b for the case of impressing a material with subsequent perpendicular cuts and FIG. 7 shows exemplarily for the case of molding polymer on a planar carrier substrate the singulation along oblique cutting surfaces 43, i.e. along cutting surfaces that are angular to the area normal of the carrier substrate.

Figure 8:
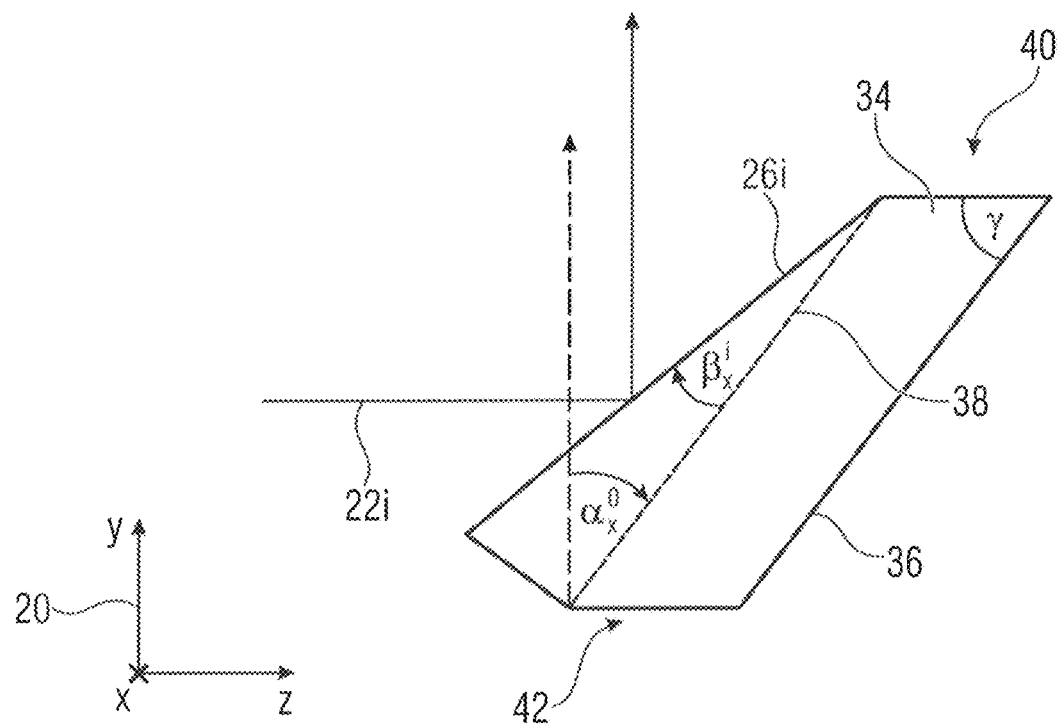
FIG. 8 is a schematic side sectional view of a mirror deflecting device according to FIG. 4b using the oblique singulation according to FIG. 7 for illustrating the advantages of oblique singulation with regard to reducing installation height.

FIG. 8 illustrates the reason for this: the cutting angle of the singulation cutting planes placed between adjacent deflecting devices running parallel to the line extension direction can be selected such that when installing the same into the multi-aperture imaging device 10, these cutting surfaces run parallel or almost parallel to the optical axes $22_i$ of the optical channels $14_i$ prior to or without beam deflection, such that, all in all, a minimum installation height of the overall system of the multi-aperture imaging device 10 results. FIG. 8 illustrates the minimum installation height resulting therefrom, as an illustration for the case of FIG. 4b where for each channel i the facets in the yz plane, i.e. in the plane, where the setting angle is greatest, are inclined such that the side 40 furthest apart from the image sensor 12 of the carrier substrate 34, which runs perpendicular to the above mentioned plane, i.e. parallel to the line extension direction of the image sensor 12, is not or less enlarged with respect to the parallelepiped shape of the carrier substrate 34 in thickness direction of the carrier substrate 34 by the additional material for forming the facets $26_i$. As shown in FIG. 8, these sides 40 and 42 run parallel to part of the optical path or the optical axis $22_i$ on the image sensor side. Advantageously, in the configuration of FIG. 4b, the singulation planes indicated by lines 43 in FIGS. 6a, 6b and 7 do not intersect the additional material forming the facets. In the configuration of FIG. 4a, this would not be the case for all the facets, and in the configuration of FIG. 4c for those facets corresponding to the configuration of FIG. 4a. However, as shown by a comparison between FIG. 4b and FIG. 8, the installation height in the y direction is not reduced in the case of FIG. 8 with respect to the case of FIG. 4b. For the angle γ between the side 40 and the rear side 36 in the yz-plane, the following applies $0.9 \cdot (90° - \alpha_x^0) \leq \gamma \leq 1.1 \cdot (90° - \alpha_x^0)$.

Figure 9:
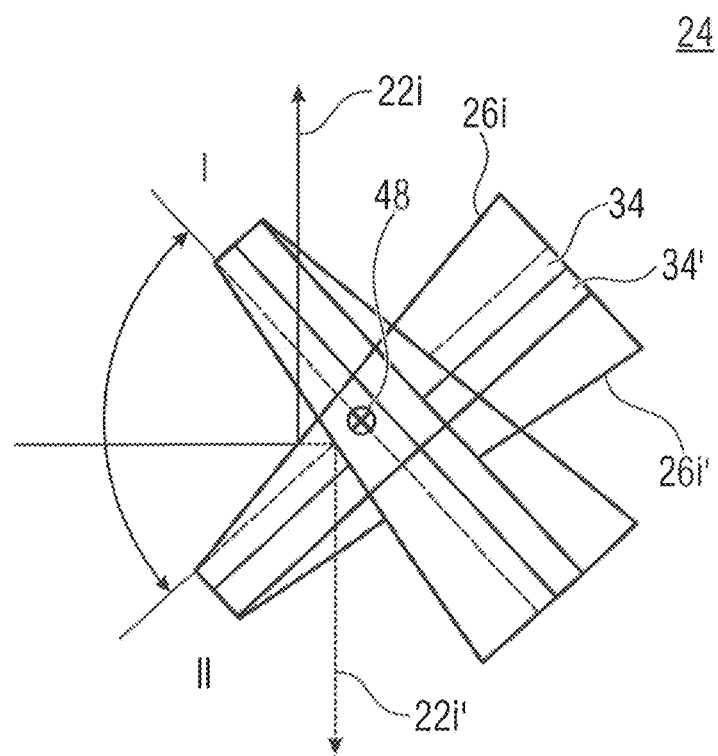
FIG. 9 is a schematic side sectional view of a mirror deflecting device, which is pivoted around an axis of rotation parallel to the line extension direction in order to be movable between first and second positions where the optical paths of the optical channels are deflected in opposite directions.

FIG. 9 illustrates exemplarily for the case of FIG. 4a that in symmetry to the rear side 36, the beam-deflecting device could comprise an equally formed substrate 34' in addition to the substrate 34. By pivoted suspension of the beam-deflecting device 24 around an axis 48 running along the line extension direction or along the x axis, the beam-deflecting device 24 could be changed from a position I with the above-described setting angle to a position II with a setting angle corresponding to an opposite inclination with respect to the image sensor 12 and hence has the effect that in the position I the facets $26_i$ effect the above-mentioned beam deflection, while in the position II the facets $26_i'$ effect a beam deflection in an essentially opposite direction as indicated in FIG. 9 by $22_i$ or $22_i'$. Obviously, it would also be possible to apply this reversibility by rotation around the axis 48 also in configurations according to FIG. 4b or FIG. 4c. For production, for example, the rear sides 36 of the two substrates 34 and 34' could be connected to one another, such as by adhesive bonding or another joining process.

Above, it has already been mentioned that the optical paths or optical axes could deviate from a parallelism prior to or without beam deflection. This circumstance will be described below by the fact that the channels could be provided with some sort of pre-divergence. With this pre-divergence of the optical axes $22_1$-$22_4$ it would be possible that, for example, not all facet inclinations are different but that some groups of channels have, for example, the facets of the same inclination. The latter could then be formed integrally or continuously merging with one another, virtually as one facet allocated to this group of channels adjacent in line extension direction. The divergence of the optical axes of these channels could then originate from the divergence of these optical axes as obtained by lateral offset between optical centers of the optics and image sensor areas of the channels. The pre-divergence could be limited, for example, to one plane. Prior to or without beam deflection, the optical axes could run, for example, in a common plane but divergent within the same and the facets effect merely an additional divergence in the other transversal plane, i.e. they are all inclined parallel to the line extension direction ($\beta^i_z=0$ for all i) and with respect to one another only differing from the above-mentioned common plane of the optical axes, wherein again several facets can have the same inclination or can be allocated together to a group of channels whose optical axes differ, for example, already in the above-mentioned common plane of the optical axes pairwise prior to, or without, beam deflection.

Figure 13A:
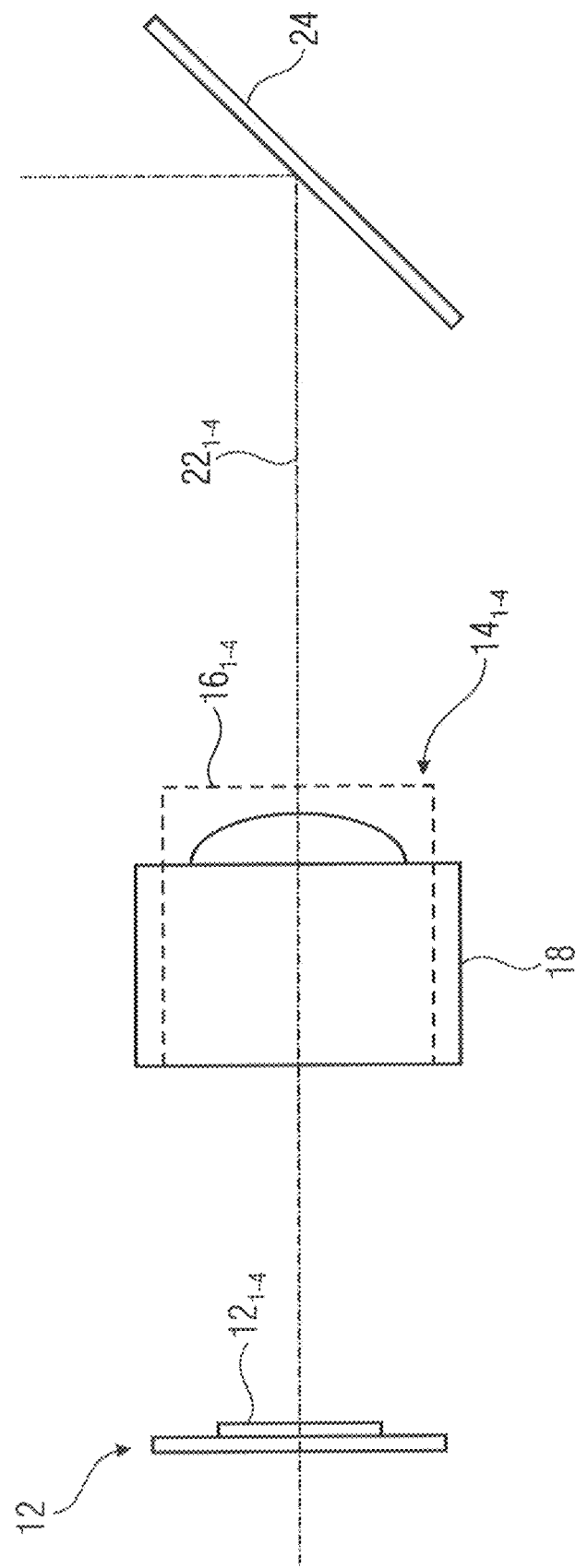
FIGS. 13a and 13b are a side sectional view and a top view of a multi-aperture imaging device according to a variation of FIG. 1 where the optical axes of the channels have a pre-divergence in order to be divergent in a common plane parallel to the line extension direction such that the number of facets having a pairwise differing inclination can be reduced.
Figure 13B:
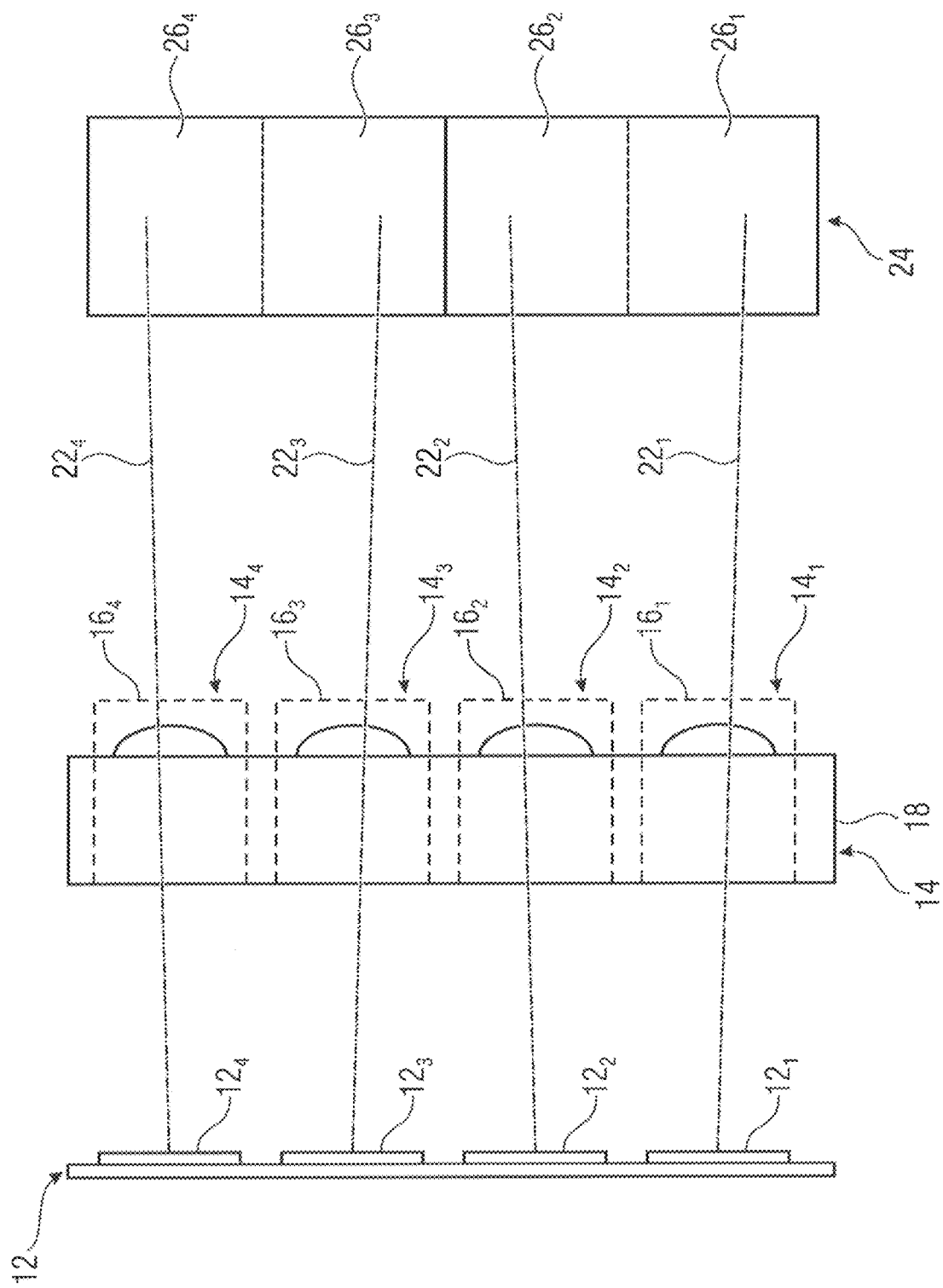

The above mentioned, possibly existing, pre-divergence can be obtained, for example, by arranging the optical centers of the optics on a straight line along the line extension direction while the centers of the image sensor areas are arranged in a manner deviating from the projection of the optical centers along the normal of the plane of the image sensor areas at points of a straight line in the image sensor plane, such as at points deviating from the points on the above mentioned straight line in the image sensor plane in a channel-individual manner along the line extension direction and/or along the direction perpendicular to both the line extension direction and the image sensor normal. Alternatively, pre-divergence can be obtained, in that the centers of the image sensors are on a straight line along the line extension direction, while the centers of the optics from the projection of the optical centers of the image sensors are arranged in a manner deviating along the normal of the plane of the optical centers of the optics on points of the straight line in the optic center plane, such as at points that deviate from the points on the above-mentioned straight line in the optic center plane in a channel-individual manner along the line extension direction and/or along the direction perpendicular to both the line extension direction and the normal of the optic center plane. It is advantageous when the above-mentioned channel-individual deviation from the respective projection runs merely in line extension direction, i.e. the optical axes that are in a common plane are provided with pre-divergence. Then, both optical centers and image sensor area centers are on a straight line in parallel to the line extension direction but with different intermediate distances. In contrast, a lateral offset between lenses and image sensors in perpendicular direction lateral to the line extension direction would result in an enlargement of the installation height. An offset merely within the plane in line extension direction does not change the installation height but possibly less facets will result and/or the facets will have only a tilting in an angular orientation which simplifies the structure. This is illustrated in FIGS. 13a and 13b where the adjacent channels $14_1$ and $14_2$ on the one hand and the adjacent channels $14_3$ and $14_4$ on the other hand have optical axes $14_1$ and $14_2$ or $14_3$ and $14_4$ running in a common plane and squinting with respect to one another i.e. provided with pre-divergence. Facets $26_1$ and $26_2$ can be formed by one facet and facets $26_3$ and $26_4$ can be formed by another facet as indicated by dotted lines between the respective pairs of facets and the only two facets are merely inclined in one direction and both in parallel to the line extension direction, i.e. ($\beta^i_z=0$ and $\beta^i_x \neq 0$ for all i and $\beta^1_x = \beta^2_x$ and $\beta^3_x = \beta^4_x$).

Further, it could be intended that some optical channels are allocated to the same partial field of view, such as for the purpose of super-resolution or for increasing the resolution by which the respective partial field of view is sampled by these channels. Then, the optical channels within such a group would run parallel prior to beam deflection and would be deflected by a facet onto a partial field of view. Advantageously, pixel images of the image sensor of a channel of a group would lie in intermediate positions between images of the pixels of the image sensor of another channel of this group.

An implementation where a group of immediately adjacent channels in line extension direction completely cover the total field of view with their partial fields of view and where a further group of immediately adjacent channels on their part also completely cover the total field of view would also be possible, for example not for super-resolution purposes, but merely for stereoscopy purposes.

Figure 10:
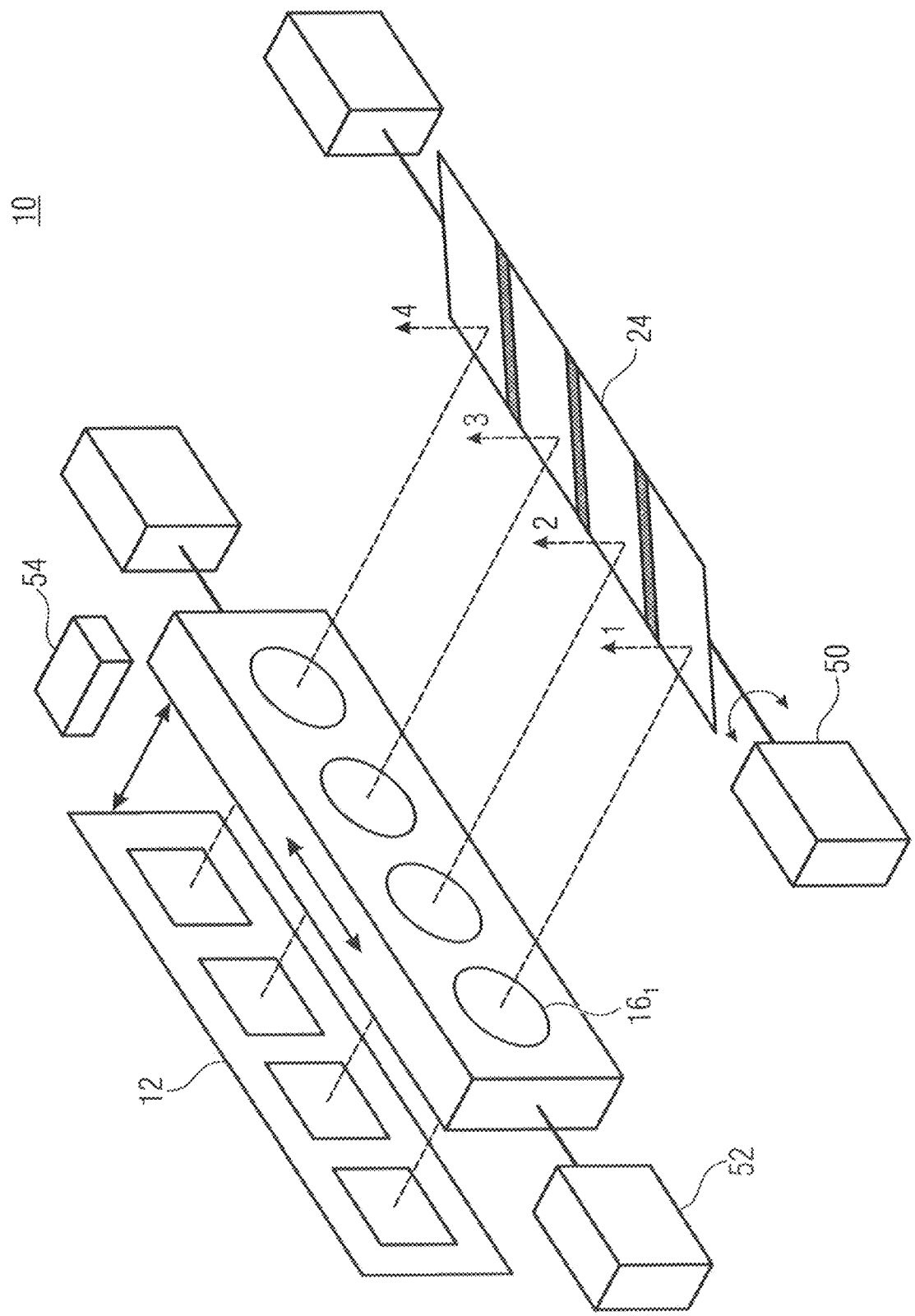
FIG. 10 is a schematic perspective view of a multi-aperture imaging device according to FIG. 1 with additional means for changing the relative locations of image sensor 12, channel array and mirror deflecting device to one another.

FIG. 10 shows that the multi-aperture imaging device 10 of FIG. 1 could additionally include a means 50 for effecting rotation of the beam-deflecting device 24 around an axis parallel to the line extension direction or x-axis. The axis of rotation is, for example, within the plane of optical axes $22_1$-$22_4$ or by less than a quarter of a diameter of the optics $16_1$-$16_4$ apart therefrom. Alternatively, it will also be possible that the axis of rotation is further apart, such as less than one optics diameter or less than four optics diameters. This means 50 could, for example, be part of an image stabilization control of the device 10 by compensating blurs around the x-axis by adaptively changing the setting angle and/or for shifting the beam-deflecting device 24 between positions I and II mentioned with reference to FIG. 9.

Further, the multi-aperture imaging device 10 of FIG. 10 can additionally or alternatively include means 52 effecting translatory movement of the optics $16_i$ along the x-axis. The means 52 can also be part of an image stabilization and can effect, for example, blurs in a direction perpendicular to the above mentioned blur compensation via means 50.

Additionally or alternatively, the device 10 can further include means 54 adjusting, for focus adjustment, a distance between image sensor 12 and optics 16 along the optical axes $22_i$. The means 54 can be controlled by autofocus control or also manually by the user of the device in which the device 10 is installed.

Thus, means 52 serves as suspension of the optics and advantageously, as indicated in FIG. 4, the same is disposed laterally next to the same along the line extension direction in order to not increase the installation height. It applies also to means 50 and 54 that the same are advantageously disposed within the plane of the optical paths in order to not increase the installation height.

It should be noted that optics $16_1$-$16_4$ could be held not only among one another, such as via the already mentioned transparent substrate, but also relative to the beam-deflecting device in a constant relative location, such as via a suitable frame which advantageously does not increase the installation height and hence runs advantageously in the plane of components 12, 14 and 24 or in the plane of the optical paths. The consistency of the relative location could be limited to the distance between optics and beam-deflecting device along the optical axes, such that means 54 moves, for example, the optics $16_1$-$16_4$ together with the beam-deflecting device in a translatory manner along the optical axes. The optics-to-beam-deflecting device distance could be set to a minimum distance such that the optical path of the channels is not laterally limited by the segments of the beam-deflecting device 24, which reduces the installation height, since otherwise the segments $26_i$ would have to be dimensioned for the greatest optics-to-beam-deflecting device distance with respect to the lateral extension in order to not restrict the optical path. Additionally, the consistency of the relative location of above mentioned frames could hold the optics and beam-deflecting device along the x-axis in a rigid manner to one another, such that means 52 would move the optics $16_1$-$16_4$ together with the beam-deflecting device in a translatory manner along the line extension direction.

The above-described beam-deflecting device 24 for deflecting the optical path of the optical channels allows, together with the actuator 50 for generating the rotary movement of the beam-deflecting device 24 of an optical image stabilization control of the multi-aperture imaging device, image or total field of view stabilization in two dimensions, namely by the translatory movement of the substrate 18 image stabilization along a first image axis running essentially parallel to the beam-deflecting device, and by generating the rotary movement of the beam-deflecting means 24 image stabilization along a second image axis running essentially parallel to the optical axis prior to or without beam deflection, or if the deflected optical axes are considered, perpendicular to the optical axes and the line extension direction. Additionally, the described arrangement can effect translatory movement of the beam-deflecting device fixed in the above stated frame and the array 14 perpendicular to the line extension direction, for example by the described actuator 54, which can be used for realizing focus adjustment and hence for implementing an autofocus function.

For the sake of completeness, it should be noted with respect to the above statements that the device, when capturing via the image sensor areas, captures one image of a scene per channel, which have been projected by the channels on the image sensor areas and that the device can optionally have a processor which combines or merges the images to an overall image that corresponds to the scene in the total field of view and/or provides additional data, such as 3D image data and depth information of the object scene for producing depth maps and for software realization, such as refocusing (determining the image definition areas after the actual capturing), All-in-Focus images, Virtual Green Screen (separation of foreground and background), etc. The latter tasks could also be performed by that processor or also externally. However, the processor could also represent a component external to the multi-aperture device.

Regarding the above statements, it should still be noted that the facets $26_i$ could be mirrored. Alternatively, it would be possible to form the additional material in addition to the parallelepiped-shaped portion of the carrier substrate of mirroring material such that separate mirroring could be omitted.

Figure 11:
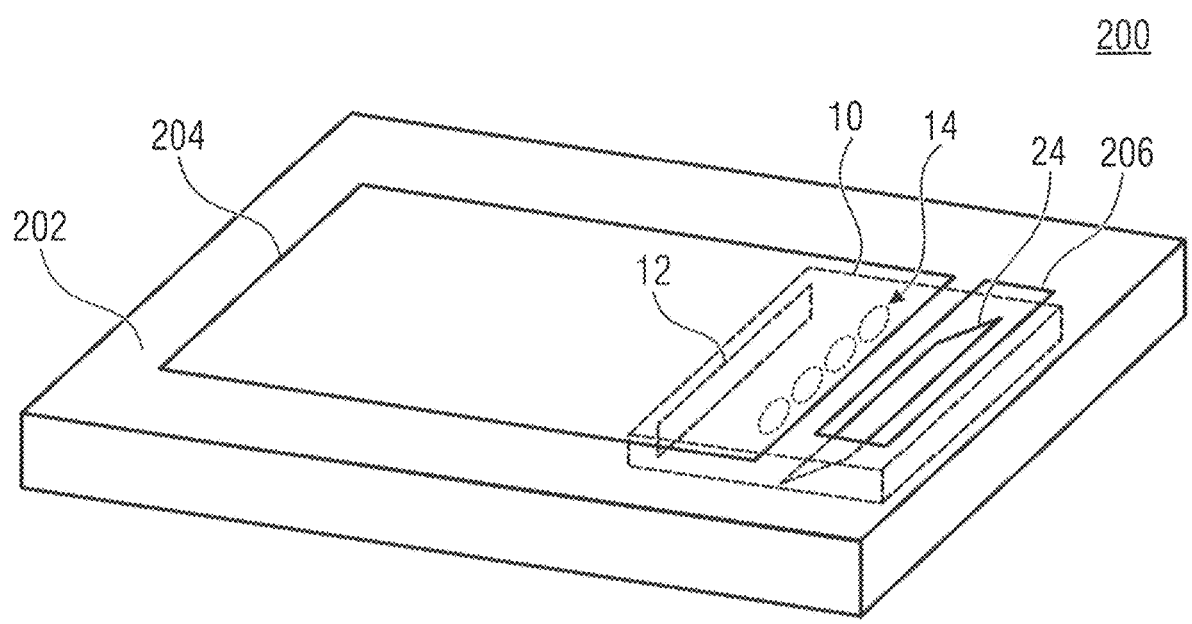
FIG. 11 is a perspective view of a mobile device for illustrating an installation of the multi-aperture imaging device.
Figure 12:
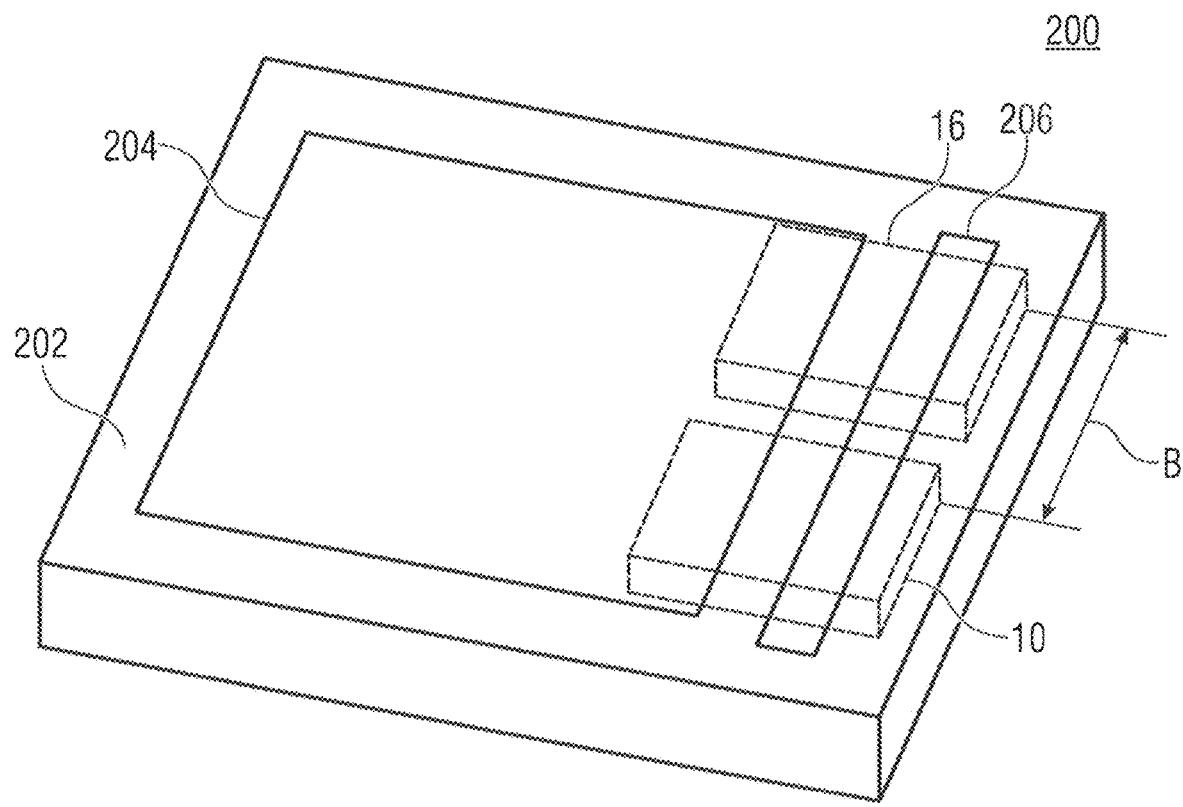
FIG. 12 is a perspective view of a mobile device for illustrating an installation of two multi-aperture imaging devices for stereoscopy purposes.

FIG. 11 illustrates that devices 10 of the above described alternatives can be incorporated, for example, in a flat housing of a portable device 200, such as a mobile phone or media player or the same, wherein then, for example, the planes of the image sensor 12 or the image sensor areas and the lens planes of the optics of the channels 14 are aligned perpendicularly to the flat extension direction of the flat housing or in parallel to the thickness direction. In that way, for example, the beam-deflecting device 24 would have the effect that the total field of view of the multi-aperture imaging device 10 is in front of a front side 202 of the flat housing that comprises also a monitor, for example. Alternatively, deflection would also be possible such that the field of view is in front of a rear side of the flat housing opposing the front side 202. The housing could comprise a transparent window in the penetrated side 202 in order to let the optical paths of the optical channels 14 pass. Further, switchable diaphragms (mechanically moved, electrochromic) could be attached in order to influence light entry through the opening of the window on the front and/or the rear side. The housing of the device 200 or the device itself can be flat, since due to the illustrated location of the device 10 in the housing, the installation height of the device 10, which is parallel to the thickness of the housing, can be kept low. Switchability could also be provided in that a window is provided on a side opposing the side 202 and, for example, the beam-deflecting device is moved between two positions by configuring the latter, for example, as a mirror mirroring on the front and on the rear as shown in FIG. 9, and wherein one of them is rotated to the other position, or as a facet mirror having a set of facets for one position and a different set of facets for the other position, wherein the sets of facets are next to one another in line extension direction and switching between the positions is performed by moving the beam-deflecting device back and forth along the line extension direction in a translatory manner. Installation of the device 10 into another, possibly non-portable device, such as a car, would also be possible. FIG. 12 shows that several modules 10 whose partial fields of view of their channels completely and optionally even congruently cover the same field of view can be installed in the device 200, for example with a base distance B to one another along a line extension direction which is the same for both modules, such as for the purpose of stereoscopy. More than two modules would also be possible. The line extension direction of modules 10 could also be non-collinear, but merely parallel to one another. However, it should still be mentioned that, as stated above, a device 10 or a module could be provided with channels such that the same completely cover the same total field of view in groups.

Thus, the above embodiments could be implemented in the form of a multi-aperture imaging device having a single-line channel arrangement, wherein each channel transmits a partial field of view of a total field of view and the partial fields of view overlap partly. A structure having several of such multi-aperture imaging devices for stereo, trio, quatro, etc. structures for 3D image capturing is possible. The plurality of modules can here be configured as continuous line. The continuous line could use identical actuators and a common beam-deflecting element. One or several amplifying substrates possibly existing within the optical path could extend across the entire line which can form a stereo, trio, quatro structure. Methods for super-resolution can be used, wherein several channels project the same partial image areas. The optical axes can be divergent, even without any beam-deflecting device, such that less facets are necessitated on the beam-deflecting unit. Advantageously, the facets then have only an angular component. The image sensor can be a one-piece unit and can have only one contiguous pixel matrix or several discontinuous ones. The image sensor can be combined of several partial sensors which are disposed, for example, next to one another on a printed circuit board. An autofocus drive can be configured such that the beam deflection element is moved synchronously with the optics or is stationary.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A multi-aperture imaging device, comprising:
an image sensor;
a plurality of optical channels;
a beam-deflecting device for deflecting optical paths of the plurality of optical channels, wherein the beam-deflecting device comprises an integral carrier substrate common for the plurality of optical channels, wherein a deflection angle of deflecting the optical paths of each optical channel is based on a setting angle of the carrier substrate of the beam-deflecting device with respect to the image sensor and on an inclination with respect to the carrier substrate, which varies among the optical channels, of a reflecting facet of a surface of the beam-deflecting device facing the image sensor, the reflecting facet being allocated to the optical channel and that the reflecting facet of the beam-deflecting device is made of additional material being molded onto the carrier substrate; and that the carrier substrate of the beam-deflecting device comprises a glass material, a polymer material, a metal material or a silicon material, wherein the facets comprise a polymer material; wherein the carrier substrate comprises a rear side facing away from the image sensor and an opposing front side, the front side and the rear side being parallel to each other.

2. The multi-aperture imaging device according to claim 1, wherein, for each channel, the setting angle is greater than an inclination angle of the inclination of the reflecting facet allocated to this channel with respect to the carrier substrate.

3. The multi-aperture imaging device according to claim 1, wherein the plurality of optical channels is adapted to detect a total field of view and forms a single-line array.

4. The multi-aperture imaging device according to claim 3, wherein the carrier substrate is positioned parallel to a line extension direction of the single-line array and the setting angle is in a plane perpendicular to the line extension direction.

5. The multi-aperture imaging device according to claim 1, wherein a surface of the beam-deflecting device facing the image sensor is mirrored at least on the reflecting facets allocated to the optical channels.

6. The multi-aperture imaging device according to claim 1, wherein the carrier substrate is parallelepiped-shaped and the reflecting facets allocated to the optical channels are formed by a material molded on the parallelepiped-shaped carrier substrate.

7. The multi-aperture imaging device according to claim 1, wherein the carrier substrate is integrally formed with the reflecting facets allocated to the optical channels in the surface facing the image sensor.

8. The multi-aperture imaging device according to claim 1, wherein the plurality of optical channels is adapted to detect a total field of view and forms a single-line array and the carrier substrate is pivoted around an axis of rotation which is parallel to a line extension direction of the single-line array.

9. The multi-aperture imaging device according to claim 8, further comprising a first actuator for generating a rotary movement of the beam-deflecting device around the axis of rotation.

10. The multi-aperture imaging device according to claim 9, wherein the first actuator is controlled by an optical image stabilization control of the multi-aperture imaging device such that image stabilization is effected by generating the rotary movement of the beam-deflecting device.

11. The multi-aperture imaging device according to claim 10, further comprising a second actuator for moving optics of the plurality of optical channels along the line extension direction of the single-line array in a translatory manner, which is further controlled by the optical image stabilization control of the multi-aperture imaging device such that, by moving the optics of the plurality of optical channels along the line extension direction of the single-line array in a translatory manner, image stabilization is effected along a first image axis and, by generating the rotary movement of the beam-deflecting device, image stabilization is effected along a second image axis.

12. The multi-aperture imaging device according to claim 1, further comprising a third actuator for moving optics of the plurality of optical channels along the optical paths of the plurality of optical channels in a translatory manner.

13. The multi-aperture imaging device according to claim 12, wherein the third actuator is controlled by a focus control of the multi-aperture imaging device.

14. The multi-aperture imaging device according to claim 1, wherein the carrier substrate further comprises two lateral faces parallel to a line extension direction and to one another, which connect the surface facing the image sensor and the rear side, wherein an angle $\gamma$ between the rear side and one of the lateral faces further apart from the image sensor fulfills the condition that $0.9 \cdot (90° - \alpha_x^0) \leq \gamma \leq 1.1 \cdot (90° - \alpha_x^0)$, wherein $\alpha_x^0$ is the setting angle.

15. Manufacturing of the multi-aperture imaging device according to claim 1, wherein the reflecting facets allocated to the optical channels are generated by:
  molding additional material onto the carrier substrate or injection molding or pressing material such that the carrier substrate is formed integrally with the reflecting facets allocated to the optical channels in the surface facing the image sensor.

16. The multi-aperture imaging device according to claim 1, wherein the carrier substrate comprises a planar body.

17. The multi-aperture imaging device according to claim 1, wherein exactly one reflective facet is assigned to an optical channel.

* * * * *